US012678954B2

(12) United States Patent
Cheng et al.

(10) Patent No.: US 12,678,954 B2
(45) Date of Patent: Jul. 14, 2026

(54) ROBOTIC DOLPHINS AND SHARKS AND FISH-LIKE ROBOTS WITH EMBODIED ARTIFICIAL INTELLIGENCE

(71) Applicant: General Cybernation Group Inc., Rancho Cordova, CA (US)

(72) Inventors: George Shu-Xing Cheng, Folsom, CA (US); Manuel Martinez, North Highlands, CA (US)

(73) Assignee: General Cybernation Group Inc., Rancho Cordova, CA (US)

( * ) Notice: Subject to any disclaimer, the term of this patent is extended or adjusted under 35 U.S.C. 154(b) by 0 days.

(21) Appl. No.: 18/747,284

(22) Filed: Jun. 18, 2024

(65) Prior Publication Data

US 2025/0381669 A1    Dec. 18, 2025

(51) Int. Cl.
*B25J 9/16* (2006.01)
*B25J 19/02* (2006.01)
*B63C 11/52* (2006.01)

(52) U.S. Cl.
CPC ........... *B25J 9/1664* (2013.01); *B25J 19/023* (2013.01); *B63C 11/52* (2013.01)

(58) Field of Classification Search
CPC ........ B25J 9/1664; B25J 19/023; B63C 11/52
See application file for complete search history.

(56) References Cited

U.S. PATENT DOCUMENTS

| | | | | |
|---|---|---|---|---|
| 10,935,986 | B1 * | 3/2021 | Yu | B63G 8/001 |
| 2015/0120045 | A1 * | 4/2015 | Tan | B63G 8/001 |
| | | | | 700/250 |
| 2017/0028563 | A1 * | 2/2017 | Hemken | B25J 11/0005 |
| 2018/0281193 | A1 * | 10/2018 | Favis | G06T 19/20 |
| 2025/0236373 | A1 * | 7/2025 | Chen | B63G 8/08 |

* cited by examiner

*Primary Examiner* — Jason Holloway
*Assistant Examiner* — Madison B Emmett
(74) *Attorney, Agent, or Firm* — DLA PIPER LLP US

(57) ABSTRACT

A robotic dolphin and shark empowered by generative artificial intelligence (Gen-AI) are disclosed, capable of autonomously performing essential tasks such as marine research, environmental monitoring, and underwater inspections. The robotic dolphin's lifelike design includes a head with snout, eyes, mouth, blowhole, body, pectoral fins, dorsal fin, and tail fin, all meticulously crafted to mimic the appearance and behavior of a real dolphin. A trained AI model functions as the brain, processing environmental data captured by video cameras, audio microphones, and sensors to provide guidance commands to a control system that controls the movements of the robotic dolphin. A well-trained live dolphin can serve as a teacher for one or multiple robotic dolphins using a generative AI-based real-time training method, enabling efficient and effective training of robotic dolphins.

20 Claims, 10 Drawing Sheets

10

30

38

34

40

44

32

36

42

48

46

ROBOTIC DOLPHINS AND SHARKS AND FISH-LIKE ROBOTS WITH EMBODIED ARTIFICIAL INTELLIGENCE

INVENTION

The subject of this patent relates to embodied artificial intelligence, fish-like robots, and guidance and control.

The advancement of large language models (LLMs) and generative artificial intelligence (Gen-AI) has made it feasible to train a fish-like robot to perform specific tasks using videos, images, and text. Such robots can be developed with embodied AI to swim in the ocean and accomplish tasks such as marine biology research, underwater inspection, environmental monitoring, and treasure hunting for sunken ships.

A fish-like robot is an advanced machine designed to resemble and mimic the structure and functionality of fishes, including sharks. A significant gap exists between generative AI models and their application in physical robotic items, including human-like and creature-like robots. This gap arises because generative AI models are typically trained using data from actual humans or creatures and their physical movements. Therefore, human-like and creature-like robots must be designed to include and mimic all the major components of the respective beings to ensure the AI model's effectiveness and utility. Accordingly, a shark-like robot should be designed to include and mimic all the major components of a shark as follows:

Head and Jaws: The head should house sensors such as cameras and sonar for navigation and obstacle detection. The jaws should be able to open and close to simulate natural shark movements and potentially interact with the environment.

Body and Skin: The body should be streamlined to reduce water resistance, covered with a flexible, waterproof material that mimics shark skin. Embedded pressure and temperature sensors can provide environmental data.

Fins: The robotic shark should have dorsal, pectoral, and pelvic fins that can move independently to provide stability, and direction.

Tail (Caudal Fin): The tail fin should be powerful and flexible to generate thrust and enable agile swimming.

Gills and Respiratory System: Although not for breathing, simulated gills can be used for water intake and filtering, housing sensors for water quality analysis.

Internal Skeleton and Musculature: An internal structure that mimics the shark's skeletal and muscular system, providing support and enabling natural movement.

Sensory Systems: Cameras, sonar, and other sensors to detect and analyze the surroundings, including visual, acoustic, and chemical signals.

Propulsion System: Motorized Joints to provide movement to the fins and tail, enabling the robot to swim in a lifelike manner.

Guidance and Control System: The "brain" of the robotic shark, it processes sensor data, makes decisions, and controls the robot's movements and behaviors in real-time.

Power Supply: A compact, high-capacity battery system to power the robotic shark, including a wireless battery charger for convenient recharging.

Communication System: A wireless communication system to relay data back to a remote operator or central database and receive commands.

These components together enable the robotic shark to operate autonomously in its underwater environment, performing its intended tasks effectively.

In this patent, we describe innovative shark-like robots and dolphin-like robots with embodied artificial intelligence that swim like sharks in the ocean and achieve tasks such as marine biology research, underwater inspection, environmental monitoring, and treasure hunting for sunken ships.

Figure 1:
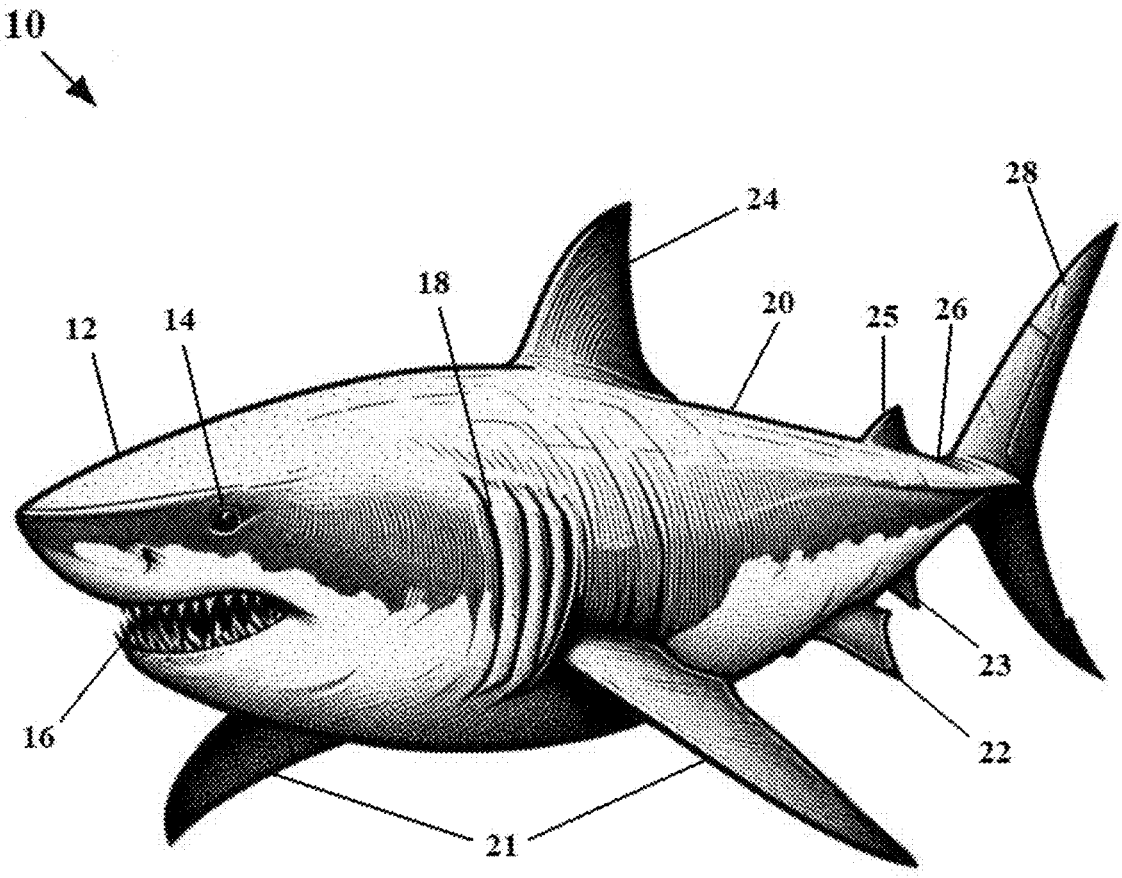
FIG. 1 is a perspective view of a shark-like robot with all key components, according to an embodiment of this invention.

In this patent, the term "mechanism" is used to represent hardware, software, or any combination thereof. The term "process" is used to represent a physical system or process with inputs and outputs that have dynamic relationships. The term "AI" means artificial intelligence. The term "LLM" means large language model. The term "SLM" means small language model. The term "Gen-AI" means generative AI. The term "GPT" means generative pre-trained transformer. The term "transformer" means a form of artificial neural network model used in generative artificial intelligence. The term "fish-like robot" means a robot that looks and behaves like a fish. The term "shark-like robot" means a robot that looks and behaves like a shark. The term "robot" or "robotic" refers to a machine resembling a human being, animal, bird, fish, or insect, capable of replicating certain movements and functions of a human being or other creatures, automatically. The term "a robotic shark" or "a shark robot" means a shark-like robot. The term "a robotic dolphin" or "a dolphin robot" means a dolphin-like robot. The term "a robotic fish" or "a fish robot" means a fish-like robot. The term GPS means Global Positioning System that provides positioning, navigation, and timing services. The term "computing processing unit" or "CPU" means a microprocessor, microcontroller, micro-control unit, or any integrated circuit capable of performing computation and executing software programs and control algorithms.

Without losing generality, a robotic shark or a shark-like robot can also mean a robotic fish or fish-like robot, and vice versa. All numerical values given in this patent are examples. Other values can be used without departing from the spirit or scope of this invention. The description of specific embodiments herein is for demonstration purposes and in no way limits the scope of this disclosure to exclude other not specifically described embodiments of this invention.

DESCRIPTION

A. Robotic Shark for Marine Biology Research

Marine Biology Research is the scientific study of marine organisms, their behaviors, and interactions with the environment. This field encompasses a wide range of activities, including the observation and analysis of marine life, monitoring of marine ecosystems, and the assessment of environmental changes and their impacts on aquatic organisms. Advanced technologies, such as autonomous underwater vehicles and AI-driven robotic systems, are increasingly used to enhance data collection, allowing researchers to conduct long-term studies with minimal environmental disturbance. This research is critical for understanding and protecting marine biodiversity, managing fisheries, and addressing environmental challenges such as climate change and pollution.

Traditional methods of observing marine life, such as divers or stationary cameras, have limited range and can disturb the natural behavior of marine species. This makes it difficult to gather accurate data on the behavior, movement patterns, and interactions of marine organisms in their natural habitats.

Human presence and traditional research equipment can negatively impact fragile marine ecosystems. The need for non-intrusive methods to study marine environments is critical to avoid further harm to coral reefs, kelp forests, and other sensitive habitats.

Collecting comprehensive data over large areas and long periods is labor-intensive and costly. There is a need for autonomous systems that can operate continuously and gather high-resolution data on various environmental parameters, such as water quality, temperature, and biodiversity.

Many marine species are difficult to monitor due to their elusive nature or habitats in deep or dangerous waters. Effective tracking and monitoring of these species require advanced technologies that can operate in harsh underwater conditions and provide real-time data.

FIG. 1 is a perspective front view of a shark-like robot with all key components, according to an embodiment of this invention. The robotic shark (10) comprises a head with snout (12), two eyes (14), a mouth with teeth (16), gill slits (18), a body or trunk (20), a pair of pectoral fins (21), a first dorsal fin (24), a second dorsal fin (25), a pair of pelvic fins (22), an anal fin (23), a precaudal pit (26), and a tail with caudal fins (28). These main components are described in the following:

Head with Snout (12): The head houses sonar sensors for navigation and obstacle detection. The snout is designed to mimic the natural shape of a shark's head.

Eyes (14): Two cameras or visual sensors are positioned to simulate the eyes, providing stereoscopic vision for depth perception and navigation.

Mouth with Teeth (16): The mouth can open and close to simulate natural shark movements and potentially interact with the environment. The teeth are designed to resemble those of a shark for authenticity.

Gill Slits (18): Although not for respiration, these slits house sensors for water quality analysis and can be used for water intake and filtering.

Body or Trunk (20): The streamlined body reduces water resistance, and is covered with a flexible, waterproof material that mimics shark skin. It houses the main internal components, including the control system and power supply.

Pectoral Fins (21): These fins are used for steering and maneuvering, providing stability and direction control.

First Dorsal Fin (24): This fin contributes to the stability and hydrodynamics of the robot, helping to prevent rolling.

Second Dorsal Fin (25): Similar to the first dorsal fin, it adds to the stability and control of the shark's movement.

Pelvic Fins (22): These fins assist with steering and maintaining balance during swimming.

Anal Fin (23): This fin helps to stabilize the robot and prevents unwanted yawing motions.

Precaudal Pit (26): This feature mimics the natural indentation found in front of the caudal fin in sharks, aiding in reducing drag and improving swimming efficiency.

Tail with Caudal Fins (28): The tail fin is powerful and flexible, generating thrust and enabling agile swimming.

These components together enable the robotic shark to mimic the natural movements and behaviors of a real shark, allowing it to operate effectively in its underwater environment.

Figure 2:
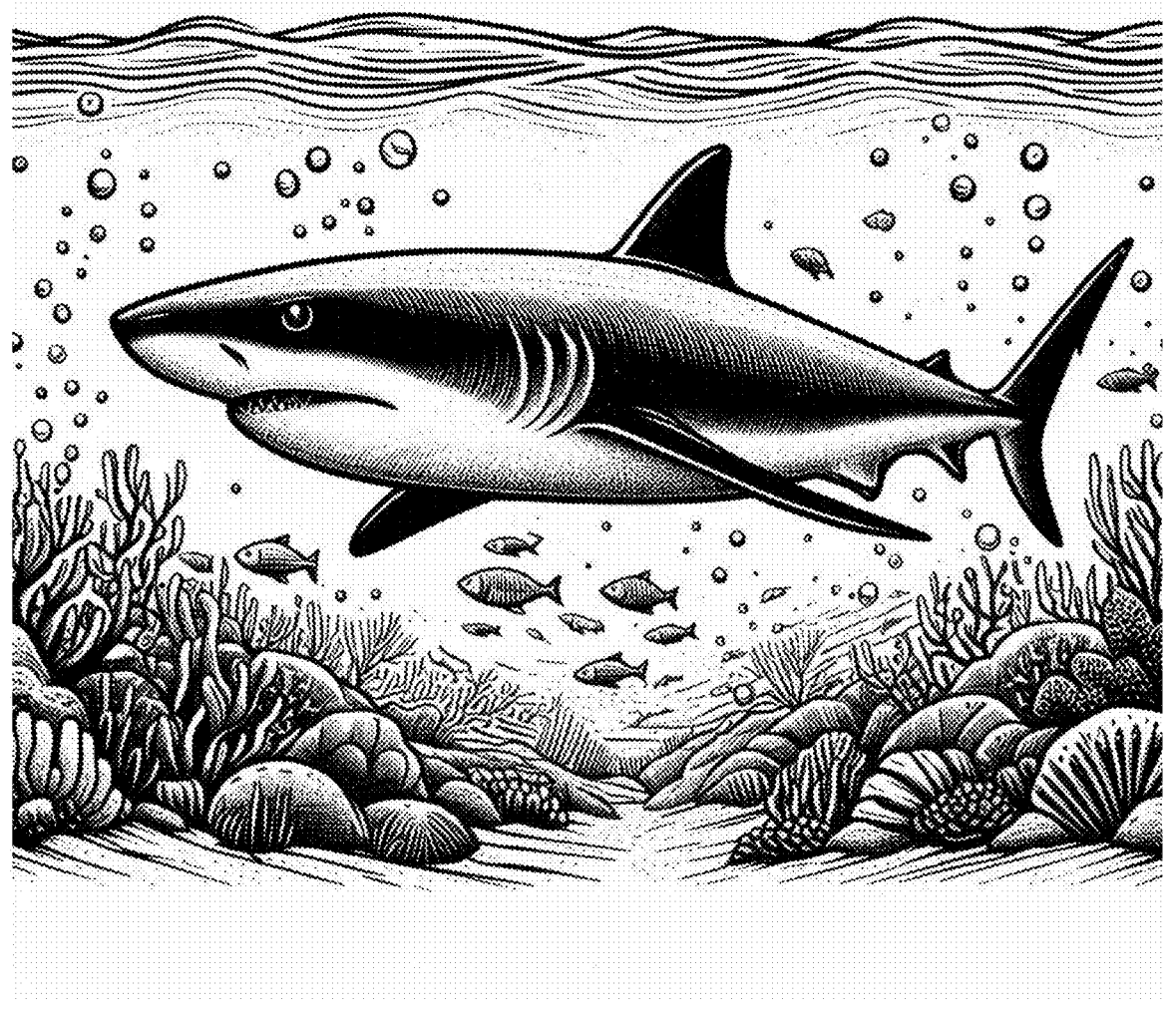
FIG. 2 is a perspective view of a robotic shark swimming above the seabed for marine biology research, according to an embodiment of this invention.

FIG. 2 is a perspective view of a robotic shark swimming above the seabed for marine biology research, according to an embodiment of this invention. The robotic shark (10) is equipped with advanced sensors, guidance and control systems, and actuators that enable it to navigate autonomously and perform various research tasks.

In addition to the components described in FIG. 1, the robotic shark also comprises:

GPS Sensor: Ensures accurate location tracking, allowing researchers to map the robot's movement and study specific areas.

Depth Sensor: Measures the depth at which the robot is operating, providing essential data for studying different marine layers.

Water Pressure Sensor: Records the water pressure, which is crucial for understanding the robot's operational environment and the conditions faced by marine life.

Temperature Sensor: Monitors the water temperature, offering valuable information for climate studies and the impact of temperature on marine ecosystems.

Seawater Content Sensors: Analyzes the chemical composition of the seawater, including salinity, mineral contents, and other dissolved elements, which are vital for understanding the health and characteristics of the marine environment.

Environmental Monitoring Sensors: Include additional sensors for measuring turbidity, dissolved oxygen, and other environmental factors critical for comprehensive marine biology research.

As the robotic shark (10) swims above the seabed, it collects valuable data for marine biology research. Its sensors capture images and videos of marine life, and its onboard systems analyze water quality and environmental conditions. The integrated GPS ensures precise tracking of the robot's movements, while depth, pressure, temperature, and seawater content sensors provide a detailed understanding of the underwater environment. This autonomous robot is designed to operate in various underwater environments, providing researchers with critical information without disturbing the natural habitat.

B. Robotic Dolphin for Underwater Inspection

Underwater inspection is the process of examining and assessing submerged structures, such as pipelines, cables, offshore platforms, and ship hulls, to ensure their integrity and safety. This field involves the use of advanced technologies, including remotely operated vehicles (ROVs) and autonomous underwater vehicles (AUVs), equipped with high-resolution cameras, sonar, and other specialized sensors. Underwater inspections are critical for early detection of damage, corrosion, or other issues that could lead to costly repairs or environmental hazards. By providing detailed real-time data, underwater inspection helps maintain the safety and functionality of essential infrastructure, supporting industries such as oil and gas, marine transportation, and environmental conservation.

Figure 3:
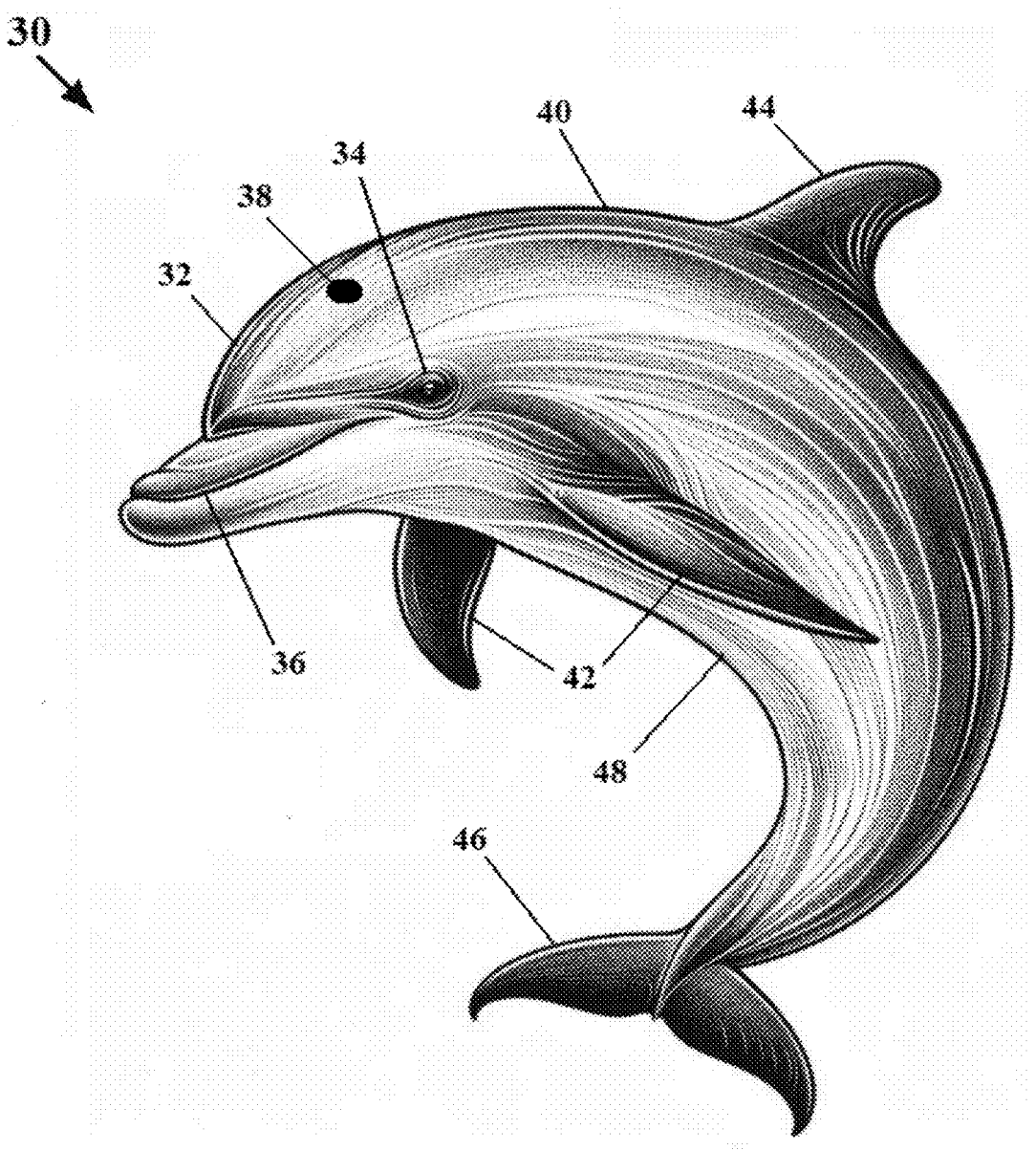
FIG. 3 is a perspective view of a dolphin-like robot with all key components, according to an embodiment of this invention.

FIG. 3 is a perspective front view of a dolphin-like robot with all key components, according to an embodiment of this invention. The robotic dolphin (30) comprises a head with snout (32), two eyes (34), a mouth with teeth (36), a blowhole (38), a body or trunk (40), a pair of pectoral fins (42), a dorsal fin (44), a tail fin (46), and a peduncle section (48). These main components are described in the following:

Head with Snout (32): The head features a streamlined snout designed to mimic the natural shape of a dolphin's head, aiding in hydrodynamic efficiency.

Eyes (34): Two eyes positioned on either side of the head, equipped with cameras and sensors to provide visual data for navigation and environmental awareness.

Mouth with Teeth (36): The mouth can open and close to simulate natural dolphin movements and potentially interact with the environment.

Blowhole (38): A blowhole on top of the head, which could be used for expelling water or housing additional sensors.

Body or Trunk (40): The main body or trunk of the robotic dolphin, containing the central processing unit, battery, and other essential components.

Pectoral Fins (42): A pair of pectoral fins on either side of the body, used for steering and maneuvering through the water.

Dorsal Fin (44): A single dorsal fin on the back of the dolphin, providing stability and aiding in navigation.

Tail Fin (46): A tail fin, consisting of two lobes, used for propulsion. The movement of the tail fin replicates the natural swimming motion of a dolphin.

Peduncle (48): The muscular section connecting the body to the tail fin, enabling powerful tail movements for propulsion.

In addition to the above components, the robotic dolphin is equipped with several sensors to enhance its functionality and data collection capabilities:

Lateral Line Sensors: Sensors along the sides of the body, mimicking the lateral line system of real dolphins, used for detecting vibrations and movements in the water.

Hydrophones: Underwater microphones integrated into the body to capture sound for communication and environmental monitoring.

Pectoral Flippers: The pectoral flippers can be used for precise movements and stabilization during swimming.

Underbelly Sensors: Additional sensors located on the underside of the body to monitor the seabed and detect any obstacles below the dolphin.

These components enable the robotic dolphin to perform a wide range of tasks, from marine research and environmental monitoring to search and rescue operations, while closely mimicking the appearance and movement of a real dolphin.

GPS Sensor: Ensures accurate location tracking, allowing researchers to map the robot's movement and study specific areas.

Depth Sensor: Measures the depth at which the robot is operating, providing essential data for studying different marine layers.

Water Pressure Sensor: Records the water pressure, which is crucial for understanding the robot's operational environment and the conditions faced by marine life.

Temperature Sensor: Monitors the water temperature, offering valuable information for climate studies and the impact of temperature on marine ecosystems.

Seawater Content Sensors: Analyzes the chemical composition of the seawater, including salinity, mineral contents, and other dissolved elements, which are vital for understanding the health and characteristics of the marine environment.

Environmental Monitoring Sensors: Include additional sensors for measuring turbidity, dissolved oxygen, and other environmental factors critical for comprehensive marine biology research.

These sensors, integrated with the main components of the robotic dolphin, provide a robust system for gathering extensive data and performing various tasks in marine environments.

Figure 4:
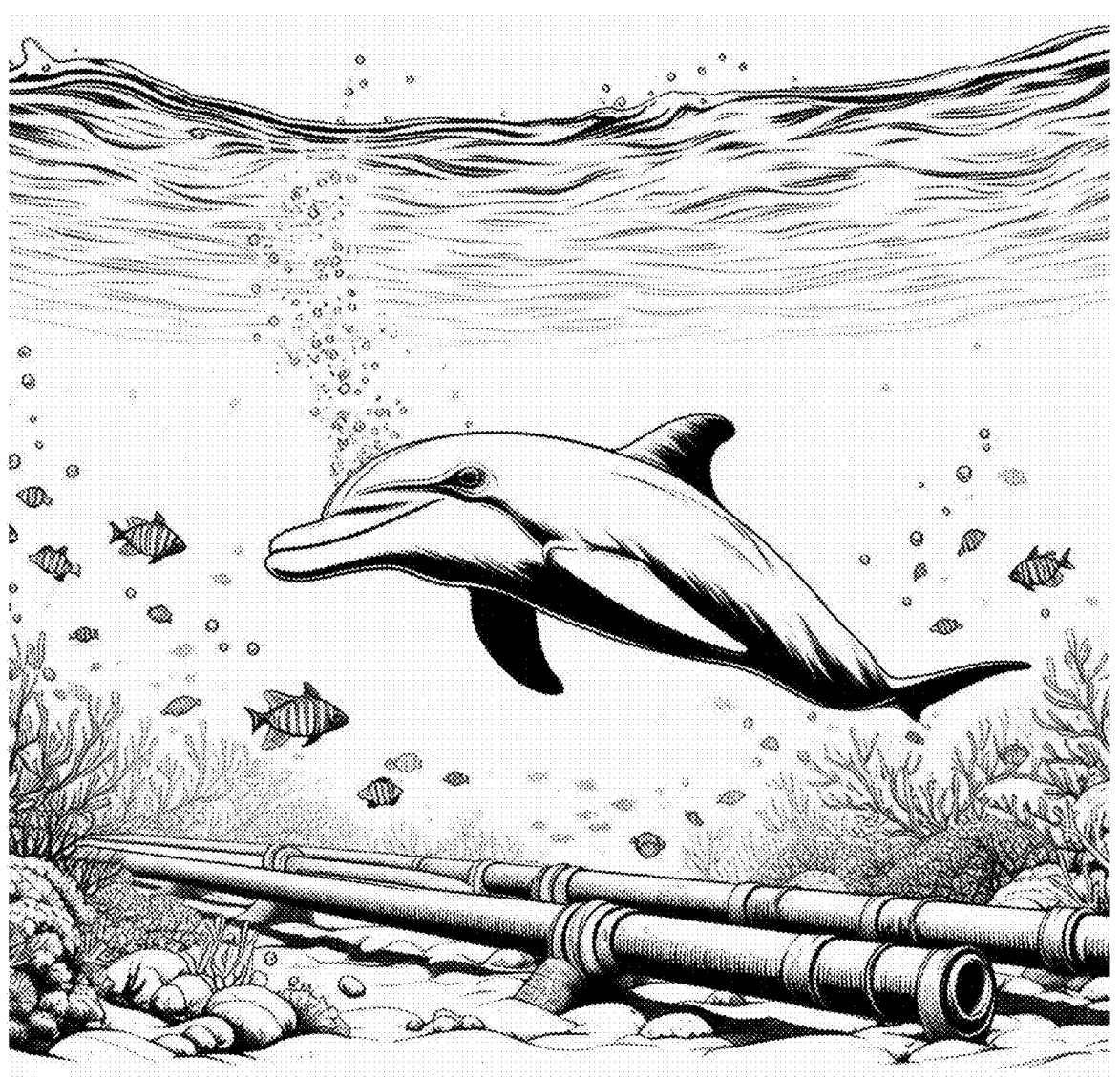
FIG. 4 is a perspective view of a robotic dolphin swimming above the seabed for marine underwater inspection, according to an embodiment of this invention.

FIG. 4 is a perspective view of a robotic dolphin swimming above the seabed for marine underwater inspection, according to an embodiment of this invention. The robotic dolphin (30) is equipped with advanced sensors, guidance and control systems, and actuators that enable it to navigate autonomously and perform various underwater inspection tasks.

As the robotic dolphin (30) swims above the seabed, it performs various underwater inspection tasks, such as examining the condition of underwater structures, pipelines, and cables. Its sensors capture detailed images and videos, while its onboard systems analyze water quality and environmental conditions. The integrated GPS ensures precise tracking of the robot's movements, and the depth, pressure, temperature, and seawater content sensors provide a comprehensive understanding of the underwater environment. This autonomous robot is designed to operate in various underwater conditions, providing valuable data for underwater inspections without disturbing the marine habitat.

The underwater tasks that the robotic dolphin can perform include but are not limited to the following:

Infrastructure Maintenance: Inspecting underwater infrastructure such as pipelines, cables, and offshore platforms is a complex and hazardous task. Traditional methods involving divers or remotely operated vehicles (ROVs) are risky, time-consuming, and expensive. There is a need for autonomous robots that can perform detailed inspections and maintenance without human intervention.

Damage Detection: Early detection of damage or wear in underwater structures is crucial to prevent catastrophic failures. Current inspection methods often miss subtle signs of deterioration, leading to costly repairs and potential environmental disasters. Advanced sensing and AI technologies are required to identify and analyze early indicators of structural issues.

Search and Recovery: Locating sunken vessels, aircraft, or other valuable items on the seabed is a challenging task due to the vast and often inaccessible nature of underwater environments. Effective search and recovery operations require robots capable of navigating and mapping large areas with high precision.

Environmental Hazards: Underwater inspections often take place in environments with poor visibility, strong currents, or hazardous conditions. Robots designed for these tasks must be robust, capable of operating in adverse conditions, and equipped with advanced sensors to provide reliable data in real-time.

C. Fish-Like Robots for Underwater Treasure Hunting

Treasure hunting for ancient ships involves the exploration and recovery of historical shipwrecks and their valuable artifacts from the seabed. This field combines maritime archaeology with advanced underwater technologies, such as remotely operated vehicles (ROVs) and autonomous underwater vehicles (AUVs), equipped with sonar, magnetometers, and high-resolution cameras. These tools enable detailed mapping and identification of potential wreck sites, even in deep and challenging environments. The goal is to uncover and preserve historical treasures, such as coins, jewelry, and cultural artifacts, providing insights into maritime history and heritage. This work requires meticulous planning and collaboration between archaeologists, historians, and engineers to ensure the ethical recovery and conservation of underwater cultural heritage.

Figure 5:
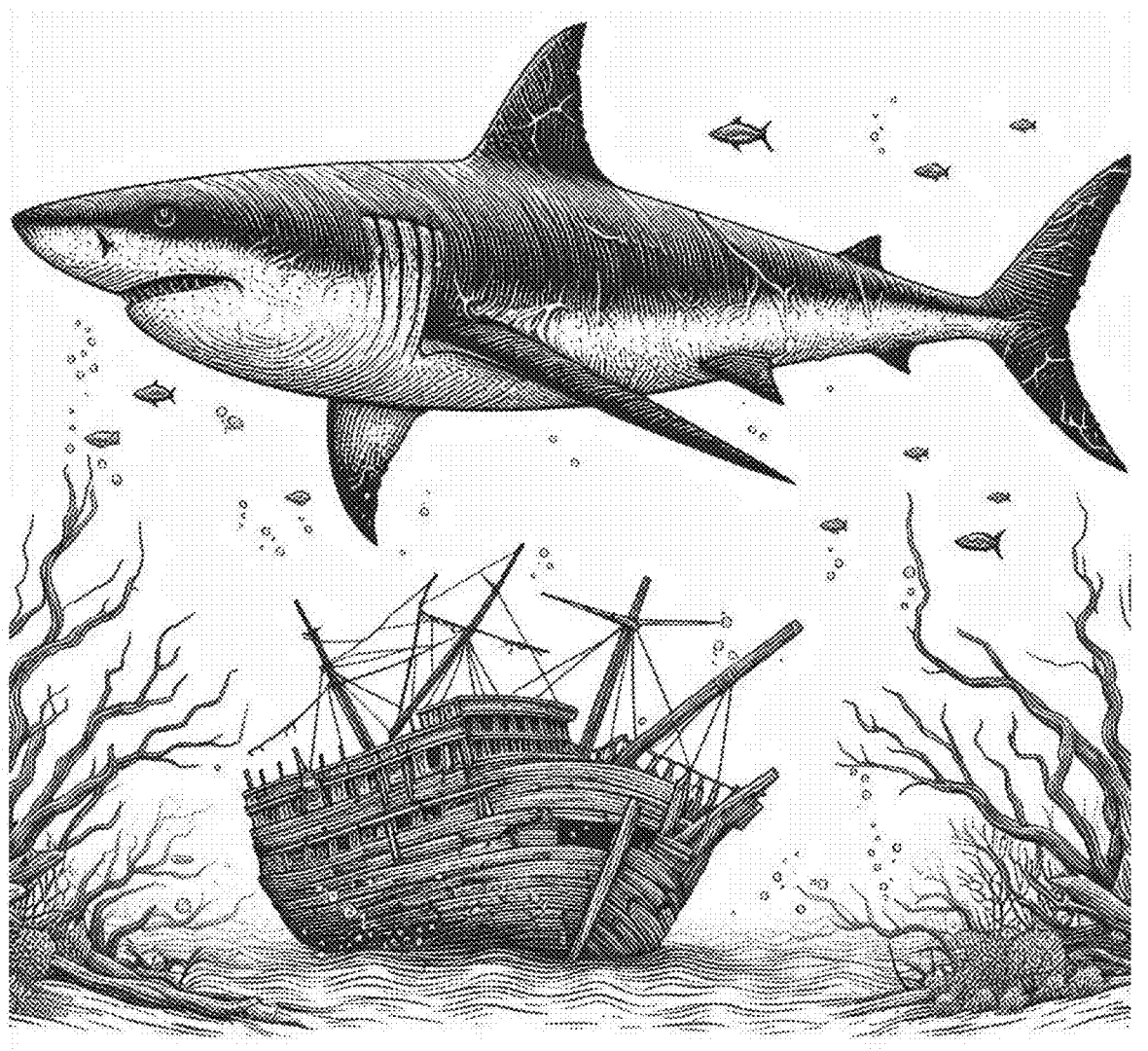
FIG. 5 is a perspective view of a robotic shark swimming above the seabed for treasure hunting for sunken ships, according to an embodiment of this invention.

FIG. 5 is a perspective view of a robotic shark swimming above the seabed for treasure hunting for sunken ships, according to an embodiment of this invention. The robotic shark (10) is equipped with advanced sensors, guidance and control systems, and actuators that enable it to navigate autonomously and perform marine underwater treasure hunting for ancient ships. The main components of the robotic shark (10) have been described in FIGS. 1 and 2, which will not be discussed again. In addition to these main components described in FIG. 1 and FIG. 2, the robotic shark (10) comprises:

Metal Detection Sensors: Specialized sensors to detect metals and artifacts buried in the seabed. These sensors can identify the presence of valuable metals such as gold, silver, and other treasure-related materials.

Ground Penetrating Radar (GPR): An advanced radar system that can penetrate the seabed to locate buried objects and structures. This technology helps in identifying the shapes and sizes of potential treasure troves without disturbing the sediment.

High-Resolution Imaging Systems: Advanced imaging systems, including multi-beam sonar and underwater LIDAR (light detection and ranging), to create detailed maps of the seabed and visualize objects buried under sediment.

Robotic Arm: A flexible and precise robotic arm capable of manipulating objects, digging, and retrieving items from the seabed. This arm is equipped with various tools for excavation and collection of artifacts.

Sample Collection Containers: Secure containers attached to the robotic shark for storing collected artifacts and samples. These containers are designed to keep the items safe and intact after retrieval.

Environmental Monitoring Sensors: Additional sensors to monitor and record the environmental conditions around the search area, ensuring the preservation of the site and compliance with archaeological standards.

Data Logging and Analysis System: An onboard system to log data from all sensors and perform preliminary analysis. This system helps in identifying potential sites of interest and planning further exploration activities.

Underwater Communication System: Enhanced communication capabilities to relay real-time data and video feeds back to a remote operator or research team. This system ensures continuous monitoring and control during treasure hunting missions.

As the robotic shark (10) swims above the seabed, it utilizes these advanced systems to locate and identify potential treasures from sunken ships. Its metal detection sensors, GPR, and magnetometer work together to find buried artifacts, while the high-resolution imaging systems provide detailed visuals of the search area. The robotic arm can excavate and retrieve items, storing them safely in the collection containers. This autonomous robot is designed to operate efficiently in underwater treasure hunting missions, providing valuable data and artifacts without disturbing the marine environment.

D. Deep-Sea Exploration and Robotic Shark Design

In this section, we describe deep-sea exploration application and robotic shark design considerations.

A major application area of the robotic shark is for deep-sea exploration. Conventional remotely operated vehicles (ROVs) and autonomous underwater vehicles (AUVs) may not perform well due to various stringent environmental conditions. Deep-sea exploration presents several unique challenges due to the extreme conditions found at great depths:

High Water Pressure: As depth increases, so does water pressure, which can reach up to 1,100 times the atmospheric pressure at sea level. This immense pressure requires specially designed, robust materials and construction techniques to prevent crushing and ensure the structural integrity of the robotic shark.

Low Temperatures: The deep sea is characterized by near-freezing temperatures, often just above 0° C. (32° F.). Electronics and mechanical components must be able to operate reliably in these cold conditions, which can affect battery performance and sensor accuracy.

Darkness: Sunlight does not penetrate the deep ocean, resulting in total darkness. The robotic shark must be equipped with powerful lighting and advanced imaging systems, such as multi-beam sonar and underwater LIDAR, to navigate and perform tasks.

Communication Limitations: Radio waves do not travel well underwater, especially at great depths. The robot must rely on acoustic communication systems, which have limited bandwidth and range, or pre-programmed autonomous operation for extended missions.

A robotic shark, not a robotic fish, is particularly suitable for stringent and tough underwater environments due to several key attributes that align with the challenges in deep-sea environment:

The robotic shark boasts superior hydrodynamics and speed, thanks to its streamlined body that reduces water resistance more effectively than many regular fish, allowing for faster and more efficient movement through water. Additionally, its strong, flexible tail fin generates significant thrust, enabling the robotic shark to cover large distances quickly and with minimal energy expenditure.

The robotic shark benefits from physiological and practical factors, utilizing the symbolic representation of sharks as powerful and efficient predators to convey the robot's capabilities and robustness. Sharks have evolved over millions of years into one of the most efficient marine predators, and using this proven biological model as a basis for robotic design ensures an effective and reliable platform for underwater exploration and tasks.

The robotic shark features enhanced stability and maneuverability, achieved through multiple fins that provide excellent stability and precision in navigating complex underwater environments. These stabilizing fins help the robotic shark maintain its course effectively. Additionally, its dynamic movement capabilities allow it to perform intricate tasks, such as inspecting infrastructure or conducting detailed surveys, with exceptional control.

The robotic shark boasts a robust and versatile design, emulating the natural durability of sharks to withstand harsh conditions, high pressures, and potential physical impacts. This robust construction allows the robotic shark to be equipped with a wide range of sensors, tools, and systems for various tasks, ranging from treasure hunting to environmental monitoring.

The robotic shark is equipped with advanced sensory capabilities, featuring optimal positioning of cameras, sonar, and metal detectors in the head and body structure. This strategic placement enhances the robot's ability to detect and analyze its surroundings effectively.

The robotic shark is designed for stealth and environmental compatibility, utilizing natural mimicry to blend into its surroundings and reduce the likelihood of disturbing marine life. Its shark-like appearance and movement are crucial for tasks requiring minimal ecological impact. Additionally, the robotic shark features silent operation, inspired by the naturally silent hunting of sharks, with propulsion systems designed to operate quietly. This is particularly beneficial for stealth operations and sensitive research tasks.

By leveraging these advantages, designing a robotic shark rather than a regular fish robot provides a more capable, versatile, and efficient tool for a wide range of demanding underwater applications, especially deep-sea explorations. The robotic shark boasts superior hydrodynamics and speed, enhanced stability and maneuverability, and a robust and versatile design.

E. Design of Guidance and Control System for Robotic Sharks

Leveraging advancements in large language models (LLM) and generative artificial intelligence (Gen-AI), we describe an innovative design for robotic sharks with embodied artificial intelligence. These robots are trained using extensive video, image, and text datasets to perform complex tasks autonomously. In this section, we explain how to design a guidance and control system for robotic sharks with Gen-AI. The method described here can also be used to develop guidance and control systems for robotic dolphins and other fish-like robots. Therefore, a guidance and control system for robotic sharks with Gen-AI can also refer to a guidance and control system for robotic dolphins with Gen-AI, or a guidance and control system for fish-like robots with Gen-AI.

Figure 6:
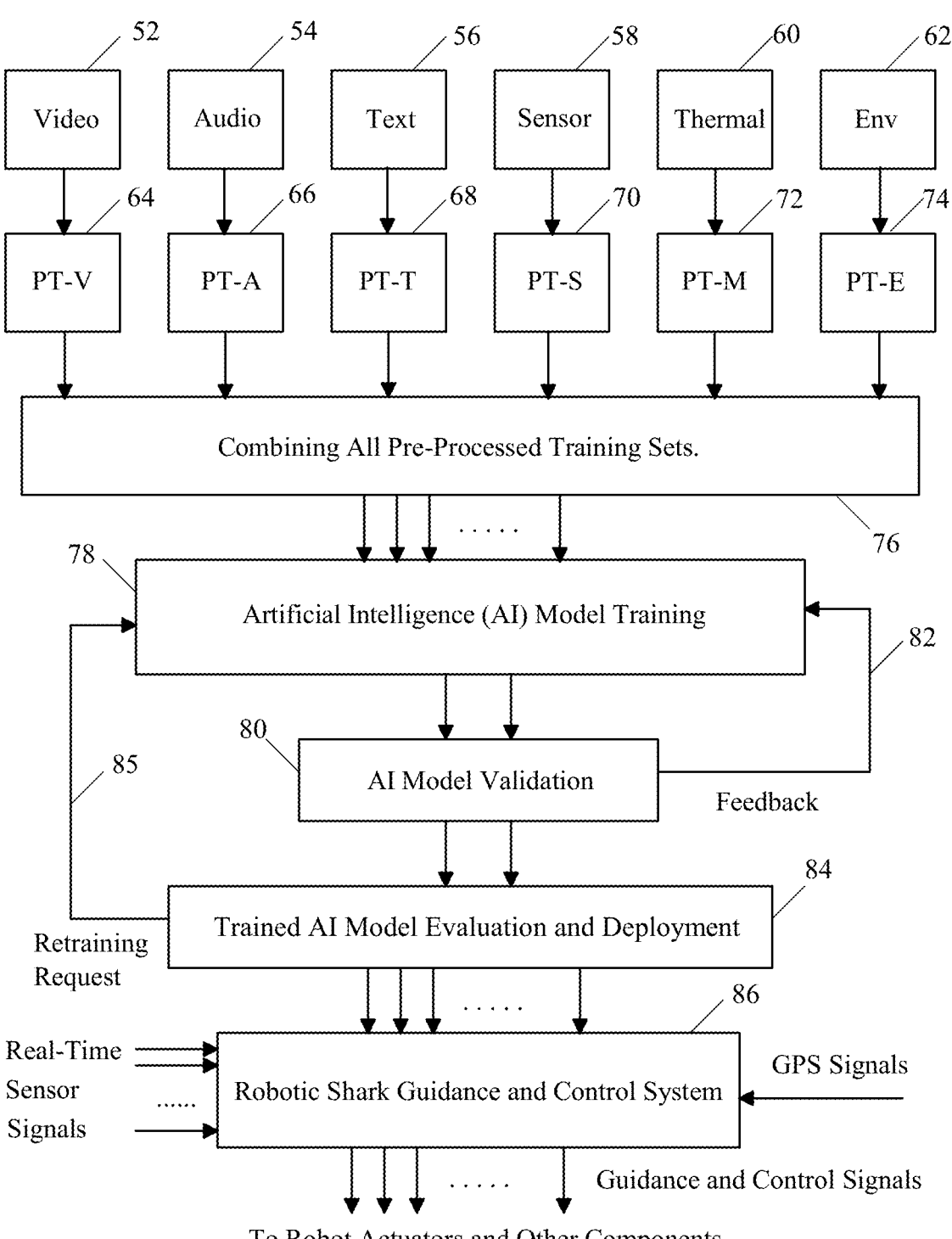
FIG. 6 is a block diagram showing the major components and workflows to develop an artificial intelligence (AI) model to be used in a robotic shark guidance and control system, according to an embodiment of this invention.

FIG. 6 is a block diagram showing the major components and workflows to develop an artificial intelligence (AI) model to be used in a robotic shark guidance and control system, according to an embodiment of this invention. The first layer comprises Video and Image Datasets (52), Audio Datasets (54), Text and Behavioral Annotation Datasets (56), Sensor Signal Datasets (58), Thermal Imaging Datasets (60), and Environmental Data Datasets (62). Each of these datasets is used to provide the following functions:

Video and Image Datasets (52) capture various videos and images including: Marine Life Footage: High-resolution videos and images of marine life, including different species of fish, coral reefs, and underwater habitats. This dataset helps the AI model recognize and understand the underwater environment and its inhabitants.

Underwater Navigation Footage: Videos and images showing navigation through various underwater terrains, including open waters, seabeds, and obstacles. This aids in training the robot to navigate effectively.

Historical Shipwrecks and Structures: Visual data of shipwrecks, underwater ruins, and other man-made structures, helping the robot identify and investigate such structures during exploration tasks.

Audio Datasets (54) record various sounds, including the following:

Marine Sounds: Recordings of natural underwater sounds, including marine animal communications, ambient ocean noise, and sonar pings. This dataset is crucial for the robot to understand and interpret underwater acoustics.

Navigation and Echo Sounds: Audio recordings from underwater navigation, capturing sounds made by the robot and its interactions with the environment. This helps the robot learn to recognize and respond to auditory cues.

Emergency Signals and Alarms: Recordings of various underwater emergency signals and alarms used in marine operations, ensuring the robot can recognize and react to emergency situations.

Text and Behavioral Annotation Datasets (56) enable the AI model developer to describe scenarios with text in videos, images, audios, sensor data, thermal images, and environmental information. Some example annotation includes the following:

Marine Biology Literature: Textual data from scientific papers, articles, and books on marine biology, providing detailed knowledge about marine ecosystems, species, and behaviors.

Underwater Navigation Manuals: Technical manuals and guides on underwater navigation and exploration techniques. This helps the robot understand best practices and methodologies for underwater operations.

Human Activity Data: Information on human activities in the ocean, including shipping routes, fishing areas, and underwater construction sites. This helps the robot avoid human-related hazards and areas of interest.

Behavioral Annotations: Annotated behaviors of marine animals and historical data on underwater exploration, helping the AI model learn patterns and decision-making processes.

Sensor Signal Datasets (58) contain data from various sensors including the following:

Sonar Data: Detailed sonar readings for mapping and navigation purposes.

Metal Detection Signals: Data from metal detectors used in identifying underwater structures.

Pressure and Depth Sensors: Information from sensors measuring water pressure and depth, essential for navigation and stability in deep-sea environments.

Movement and Orientation Data: Signals from gyroscopes and accelerometers, aiding in the precise control of the robot's movements.

Thermal Imaging Datasets (60) contain thermal videos and images that capture the heat signatures of marine life, fish and creatures, and underwater structures, useful for identifying living organisms and detecting thermal anomalies. They may also including the thermal mapping data for creating thermal maps of the underwater environment, aiding in the identification of hydrothermal vents and other heat-emitting sources.

Environmental Data Datasets (62) record data from various sensors including the following:

Water Temperature: Measurements of water temperature at various depths, providing data for understanding thermal layers and their impact on marine life.

Salinity and PH Levels: Chemical properties of seawater, including salinity and pH levels, which are vital for monitoring environmental conditions.

Seafloor Topography: Detailed maps and data on the seafloor's topography and geological features, such as underwater mountains, trenches, and hydrothermal vents.

Turbidity and Dissolved Oxygen: Data on water clarity and oxygen levels, important for assessing the health of marine ecosystems.

By incorporating these diverse datasets, the AI model for the robotic shark's guidance and control system can leverage the power of LLMs and Gen-AI to operate autonomously and intelligently in challenging marine environments, fulfilling its designated roles in exploration, inspection, and research.

All datasets go through a data preparation step to achieve the following goals: (i) Data Cleaning: Removing any irrelevant or noisy data to ensure high-quality inputs; (ii) Data Augmentation: Generating additional training data through techniques such as translation, cropping, or rotating images (if applicable); and (iii) Data Tokenization: Converting raw text into a format suitable for the model, such as tokens or embeddings.

The prepared datasets of video, image, audio, text, sensor, thermal, and environmental information then enter the second layer, which comprises a number of pre-training mechanisms or blocks for pre-training the datasets before they can be used for AI model training. Here, "block" refers to a mechanism that includes hardware, software, or a combination of both to perform specific functions.

Video and Image Datasets (52) enter Pre-training Block PT-V (64), Audio Datasets (54) enter Pre-training Block PT-A (66), Text Datasets (56) enter Pre-training Block PT-T (68), Sensor Datasets (58) enter Pre-training Block PT-S (70), Thermal Imaging Datasets (60) enter Pre-training Block PT-M (72), and Environmental Data Datasets (62) enter Pre-training Block PT-E (74). The pre-training process in each block is designed to clean and prepare the datasets for subsequent AI model training.

The pre-training process typically includes the following steps: (i) Model Initialization: Setting up the model with initial weights, often based on a pre-existing, pre-trained model; (ii) Training on a Large Corpus: Training the model on a large, diverse dataset to learn general language patterns and representations; and (iii) Using Transformers: Implementing transformer architectures, a type of AI neural network widely used in large language model (LLM) training, to efficiently process and generate sequences.

Block (76) combines the cleaned and pre-trained datasets from the individual pre-training blocks. This integration ensures that the datasets are synchronized and formatted appropriately for the next stage of the AI model training process.

The combined datasets then enter Blocks 78 and 80 to perform AI model training and validation. This training process starts with using a commercially available or open-source large language model (LLM) base model. Utilizing such a base model simplifies and streamlines the actual secondary model training and fine-tuning, making the entire process more efficient and manageable. Secondary model training and fine-tuning is the step of adapting the base model to specific tasks by further training it on task-specific datasets. This involves adjusting the model's weights and hyperparameters to optimize its performance for the desired applications.

Neural network weights are the parameters within the model that are adjusted during training to minimize the error in predictions. They determine the strength of the connection between neurons in different layers of the network. Hyperparameters, on the other hand, are the settings that define the overall structure and behavior of the model, such as learning rate, batch size, and the number of layers. These are set before training begins and can significantly impact the model's performance and training efficiency.

The secondary AI model training, fine-tuning, and validation may require substantial computing power and time, involving multiple recurring steps until the model training can be considered complete based on certain model convergence and validation criteria. These steps typically include the following: (i) Task-Specific Training: Training the pre-trained model on a specific dataset tailored to the desired application (e.g., classification, translation); (ii) Adjusting Hyperparameters: Tweaking learning rates, batch sizes, and other parameters to optimize performance for the specific task; and (iii) Validation: Continuously validating the model on a separate validation set to monitor performance and prevent overfitting.

Overfitting means that the model learns the training data too well, including noise and minor details, which negatively impacts its performance on new unseen data. It results in a model that performs well on the training data but poorly on validation or test data, indicating that it has not generalized well to new situations.

During the Validation (80) step, feedback information is sent back through Step (82) to maintain a continuous relationship between the AI Model Training Block (78) and the AI Model Validation Block (80). This iterative process ensures that the model training continues until it meets the required model convergence and validation criteria, ensuring robust and accurate performance.

After the AI model is validated, it enters Block (84) for model evaluation and deployment. The evaluation may include: (i) Performance Metrics: Assessing the model using metrics like accuracy, precision, recall, F1 score, and loss to evaluate its effectiveness. The F1 score is a measure of a model's accuracy that considers both precision (the number of true positive results divided by the number of all positive results, including those not identified correctly) and recall (the number of true positive results divided by the number of positives that should have been identified). It is the harmonic mean of precision and recall, providing a single metric that balances both concerns; and (ii) Error Analysis: Analyzing errors and misclassifications to understand model weaknesses and areas for improvement.

The deployment should include: (i) Model Optimization: Compressing and optimizing the model for faster inference and lower resource usage through techniques such as pruning and quantization. Pruning involves removing less important weights in the neural network to reduce its size and complexity, while quantization reduces the precision of the numbers used to represent the model's parameters, making the model smaller and faster without significantly affecting performance; (ii) Integration: Integrating the model into the target application or system to ensure it functions correctly in the intended environment; and (iii) Monitoring and Maintenance: Continuously monitoring the model's performance in real-world scenarios and retraining or updating as necessary to maintain and improve performance. The request for model retraining or updating is shown in Step (85), ensuring that the model remains effective and up-to-date.

All of the steps from gathering datasets to AI model training, validation, and deployment that can be used in this embodiment are any of the known techniques described in the book, "Large Language Models in Action: Design, Build, and Deploy Intelligent LLM Applications" by Liam Sturgis, independently published in April 2024, wherein the book and its contents are herein expressly incorporated by reference in their entirety. All software programs, AI models, and control algorithms are executed using computing processing units (CPU). The term "computing processing unit" or "CPU" means a microprocessor, microcontroller, microcontrol unit, or any integrated circuit capable of performing computation and executing software programs and control algorithms.

Figure 7:
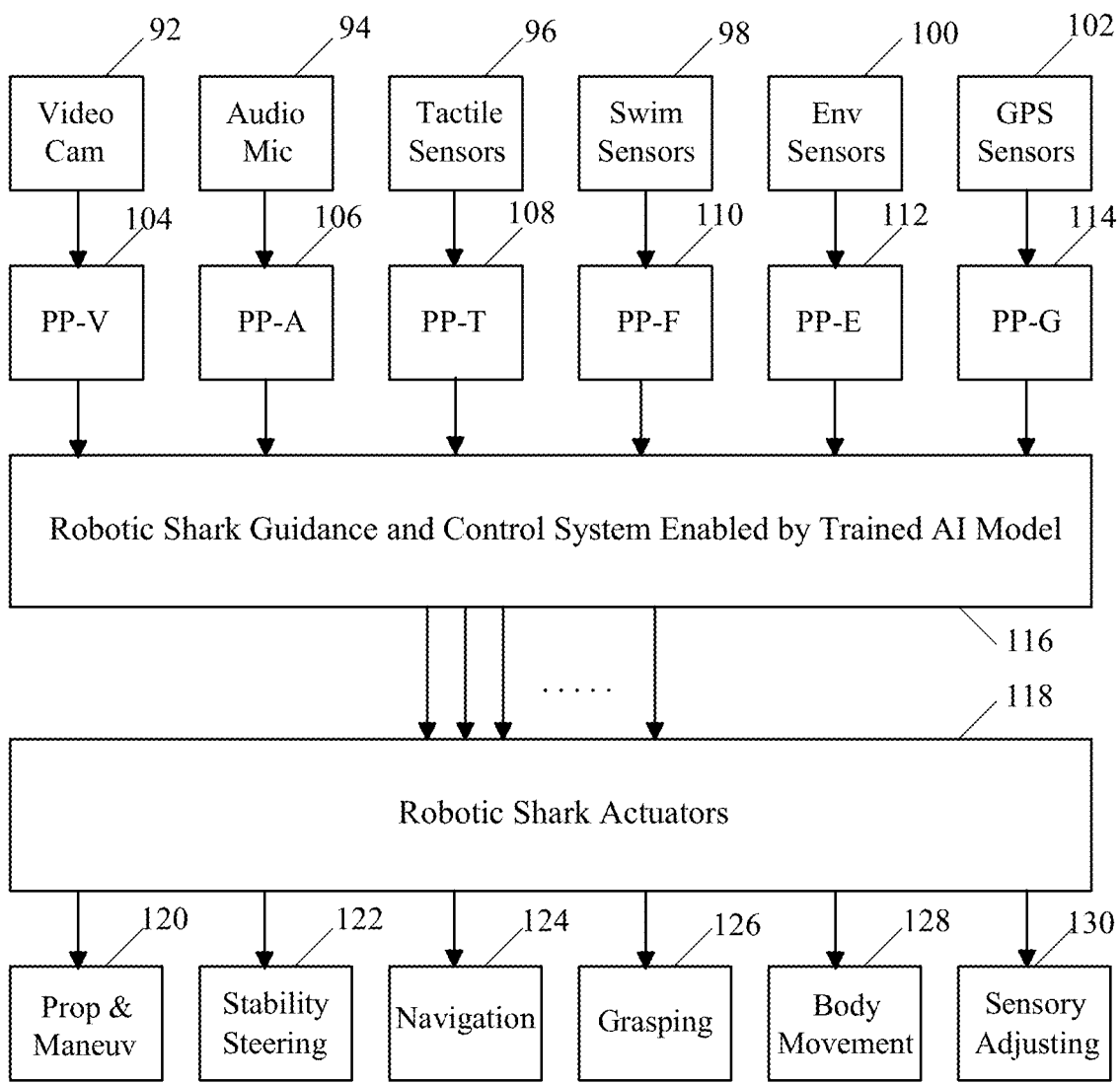
FIG. 7 is a block diagram showing the major components, including sensors, control system, actuators, and signal flows of a robotic shark guidance and control system enabled by a trained AI model, according to an embodiment of this invention.

The trained AI model will be integrated with the Robotic Shark Guidance and Control System (86) to be described in FIG. 7.

FIG. 7 is a block diagram showing the major components, including sensors, control system, actuators, and signal flows of a robotic shark guidance and control system enabled by a trained AI model, according to an embodiment of this invention.

A guidance and control system for a robotic shark is a sophisticated mechanism that directs the robot's movements and actions in real-time. The guidance part involves determining the optimal path and actions for the robot based on inputs from various sensors, such as video cameras, audio microphones, and GPS sensors. This includes processing environmental data to navigate obstacles, adjust swimming paths, and execute specific tasks. The control part translates these guidance decisions into precise commands for the actuators, ensuring smooth and accurate movements of the robot's head, fins, tail, and other parts. Together, this system enables the robotic shark to perform complex tasks autonomously and efficiently.

The first layer of the guidance and control system comprises various sensors that provide the necessary data for system:

Video Cameras (92): Capture visual data from the robot's surroundings.

Audio Microphones (94): Record underwater sounds for environmental awareness.

Tactile Sensors (96): Detect physical interactions and touch. These sensors are installed in strategic locations on the robotic shark, including the head and snout to detect interactions with obstacles or objects in the environment, the edges of the pectoral and dorsal fins to sense contact with surrounding objects or marine life, the body surface to detect pressure changes and physical interactions, and the tail fin to provide feedback on water flow and physical contact. This distribution aids in navigation, obstacle avoidance, maneuvering, stabilizing movements, environmental awareness, and collision detection.

Swimming Sensors (98): Measure the orientation, acceleration, and angular velocity of the robotic shark, providing crucial data for tracking its motion and maintaining stability. More specifically, these are Inertial Measurement Units (IMUs), which may include (i) accelerometers to measure linear acceleration along one or more axes, (ii) gyroscopes to measure angular velocity around one or more axes, and (iii) magnetometers to measure the magnetic field to provide orientation relative to the Earth's magnetic field.

Environmental Sensors (100): Collect data on temperature, salinity, and other water properties.

GPS Sensors (102): Provide precise location data for navigation and mapping purposes.

Each of these sensors may include specialized hardware and software to process the collected data effectively.

The signals from video cameras (92), audio microphones (94), tactile sensors (96), swim sensors (98), environmental sensors (100), and GPS sensors (102) then enter the second layer of the system. This layer comprises signal pre-processing mechanisms for signal cleanup and validation before they can be used for guidance and control.

As shown in FIG. 7: Video signals (92) enter Preprocessing Block PP-V (104); Audio signals (94) enter Preprocessing Block PP-A (106); Tactile signals (96) enter Preprocessing Block PP-T (108); swim sensor signals (98) enter Preprocessing Block PP-F (110); Environmental sensor signals (100) enter Preprocessing Block PP-E (112); GPS sensor signals (102) enter Preprocessing Block PP-G (114). Each preprocessing block is responsible for cleaning and validating the respective signals to ensure they are accurate and reliable for the subsequent guidance and control processes.

The output of each preprocessing block then enters the Robotic Shark Guidance and Control System Enabled by Trained AI Model (116) as input signals. This system produces output signals based on guidance and control algorithms in real-time to manipulate the Robotic Shark Actuators (118). These actuators guide and control the motions of various parts of the robotic shark, including:

Propulsion and Maneuvering Actuators (120) including: Caudal Fin Actuators of the Tail;

Stabilization and Steering Actuators (122) including: (i) Pectoral Fin Actuators, (ii) Dorsal Fin Actuator, (iii) Pelvic Fin Actuators, and (iv) Anal Fin Actuator;

Navigation and Orientation Actuators (124) including: (i) Head Actuator, and (ii) Eyes Actuator;

Grasping and Interaction Actuators (126) including: (i) Jaw Actuator; and (ii) Robotic arm;

Body Movement and Flexibility Actuators (128) including: Body Segment Actuators.

Sensory Adjustment Actuators (130) including: (i) Lateral Line Actuators, and (ii) Gills Actuator.

The robotic shark employs its propulsion and maneuvering actuators, specifically the caudal fin actuators, to generate powerful thrusts that propel it forward efficiently through deep water. The strong, flexible movements of the caudal fin provide the primary means of propulsion, allowing the shark to cover large distances quickly. The tail rudder actuator fine-tunes these movements, enabling precise directional changes and enhanced maneuverability.

Stabilization and steering are managed by the pectoral, dorsal, pelvic, and anal fin actuators. These fins work in concert to maintain the shark's stability and balance as it navigates complex underwater environments. The pectoral fins provide lift and aid in steering, while the dorsal fin offers stability during swimming. The pelvic and anal fins further contribute to stability and assist in making fine adjustments to the shark's orientation.

For navigation and orientation, the head and eyes actuators adjust the shark's head position and focus its camera-equipped eyes, allowing it to align with targets and effectively analyze its surroundings. The body segment and spine actuators enable the shark to perform fluid, undulating movements, mimicking the natural swimming patterns of real sharks. This flexibility allows the robotic shark to navigate through tight spaces and strong currents with ease.

When performing tasks, the jaw actuator facilitates grasping objects or collecting samples, while the sensory adjustment actuators, including the lateral line and gills actuators, help the shark detect water currents and measure environmental parameters. This comprehensive system of actuators ensures that the robotic shark can effectively and efficiently carry out a wide range of tasks in deep water environments, from detailed surveys and infrastructure inspections to environmental monitoring and sample collection.

F. Wireless Battery Charging for Fish-Like Robots

Since a robotic shark or fish swims and performs its tasks autonomously without human interaction and remote control, charging the battery inside the robot body becomes a crucial part of the design.

Figure 8:
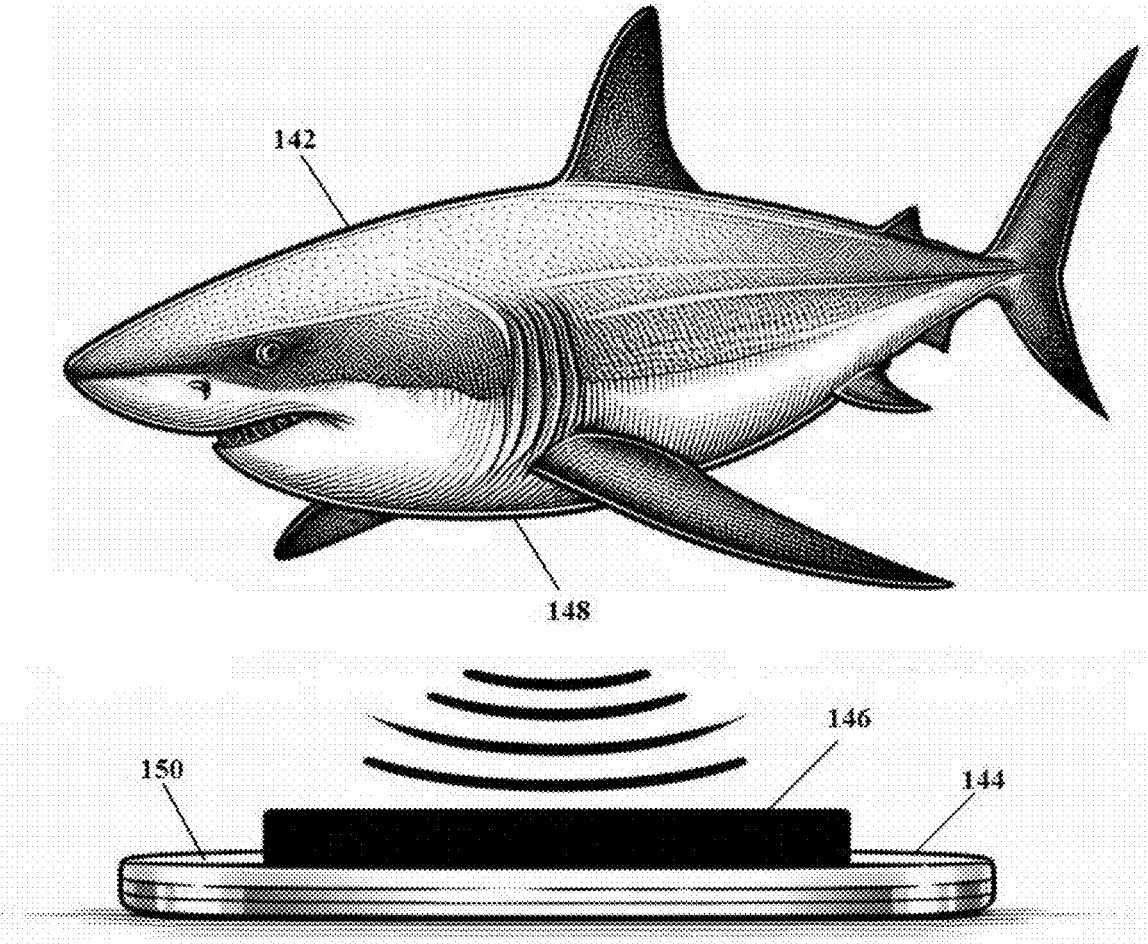
FIG. 8 is a perspective view of a robotic fish positioned above a platform for wireless battery charging, according to an embodiment of this invention.

FIG. 8 is a perspective view of a robotic fish positioned above a platform for wireless battery charging, according to an embodiment of this invention.

A wireless battery charging system is designed to charge the battery of the robotic fish wirelessly, ensuring it can perform its tasks autonomously without human interaction or remote control. In this system, the robotic fish can simply position itself above the battery charger, as illustrated in FIG. 8, which comprises the following components:

Robotic Fish (142): The robotic fish that needs to charge its battery.

Charging Platform (144): A platform designed to accommodate the robotic fish, enabling it to position itself above the charging platform while charging. The charging platform underwater can be mounted on top or side of a pole or a structure secured by the seabed.

Wireless Charging Coil (146): Embedded within the charging platform, this coil generates an electromagnetic field to transfer energy wirelessly to the battery of the robotic fish.

Receiving Coil (148): Integrated within the body of the robotic fish, this coil receives the electromagnetic energy from the charging platform and converts it into electrical energy to charge the battery.

Charging Control Unit (150): A control unit that manages the charging process, ensuring the battery is charged efficiently and safely. It may include features such as overcharge protection and charging status indicators.

Since the robotic fish is likely to operate in remote areas, the battery charging station should be situated in a location that the robotic fish can easily reach and position itself for resting and charging. The battery charging station may be positioned underwater near the shore of the land or island. The power supply options for the battery charging station include: (i) Grid AC Power: Utilizing existing grid infrastructure to provide consistent electrical power; (ii) Off-Grid Solar Power with Battery Backup: Harnessing solar energy through solar panels, with battery storage to ensure power availability during nighttime or cloudy conditions; (iii) Wind Power with Battery Backup: Generating power through wind turbines, with battery storage to maintain a steady power supply when wind conditions are variable; (iv) Ocean Wave or Tidal Power: Harvesting ocean wave or tidal energy through turbines, and (v) Combination of Grid AC Power, Solar Power, Wind Power, and Ocean Wave or Tidal Power: Integrating multiple power sources to enhance reliability and ensure continuous power availability regardless of environmental conditions.

G. Generative AI-Based Real-Time Robotic Dolphin Training

Dolphins are the smartest creatures living in the ocean and are considered the best friends of humans in water. Raising and training a companion dolphin or service dolphin requires many years of hard work, patience, and love. Dolphins generally have a short lifespan, typically around 20 to 30 years. When a dolphin passes away, it really breaks the heart of the trainer and is a significant loss for any organization that relies on the service dolphin. In this section, we introduce an innovative approach to address this challenge.

A generative AI-based robotic dolphin can be designed to learn and mimic the behaviors of a real dolphin through continuous online training by having a real dolphin and robotic dolphin live and play together. By using generative AI-based real-time training for robotic dolphins, we can develop highly intelligent and responsive robotic companions that can serve the same purposes as living dolphins without the associated emotional and logistical difficulties.

This innovative approach not only ensures that the robotic dolphins can perform complex tasks with high accuracy but also provides a sustainable and ethical alternative to using live dolphins. The generative AI system enables the robotic dolphin to adapt to new situations, learn from real-time interactions, and improve its performance continuously.

Figure 9:
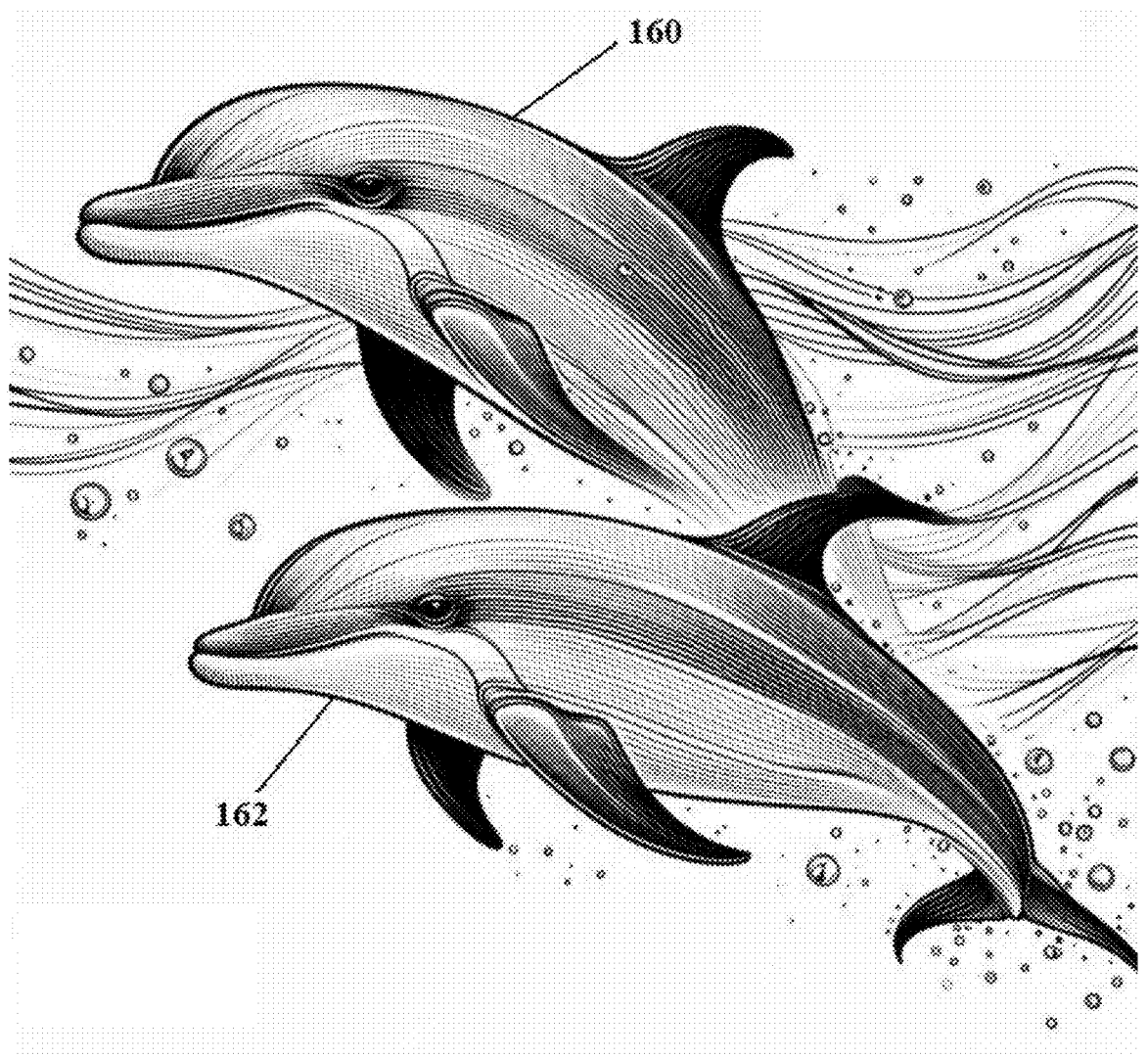
FIG. 9 illustrates a real dolphin and a robotic dolphin with a similar look, wherein the robotic dolphin can learn and mimic the behaviors of the real dolphin through continuous online training, according to an embodiment of this invention.

FIG. 9 illustrates a real dolphin and a robotic dolphin with a similar look, wherein the robotic dolphin can learn and mimic the behaviors of the real dolphin through continuous online training, according to an embodiment of this invention.

The real dolphin (160) has been trained and raised by a human for a few years and can perform tasks as a service dolphin. The robotic dolphin (162) has all the components and capabilities of the robotic dolphin (30) described in FIG. 3. When the two dolphins live together, the robotic dolphin (162) can enter an online training mode, allowing it to learn the behaviors and capabilities of the real dolphin (160).

This approach can be very useful in many application scenarios. A few case examples are presented in the following:

Companion and Therapy Dolphins: The robotic dolphin can be used in therapeutic settings to provide comfort and companionship to individuals, mimicking the gentle and playful behavior of a real dolphin.

Marine Research: Robotic dolphins can assist researchers by performing repetitive tasks, collecting data, and monitoring marine environments without the need for constant human intervention.

Entertainment and Education: In aquariums and marine parks, robotic dolphins can perform shows and interact with visitors, providing educational value while reducing the need for live dolphins.

Rescue and Recovery Missions: The robotic dolphin can be deployed in search and rescue missions to locate and assist in the recovery of objects or individuals underwater, leveraging its ability to mimic real dolphin behaviors for efficient operations.

Environmental Monitoring: Equipped with advanced sensors, the robotic dolphin can monitor environmental conditions, such as water quality and marine life health, providing valuable data for conservation efforts.

By employing generative AI-based real-time training, the robotic dolphin (162) can continuously learn and adapt to new situations, ensuring it remains a valuable asset in various application scenarios.

Figure 10:
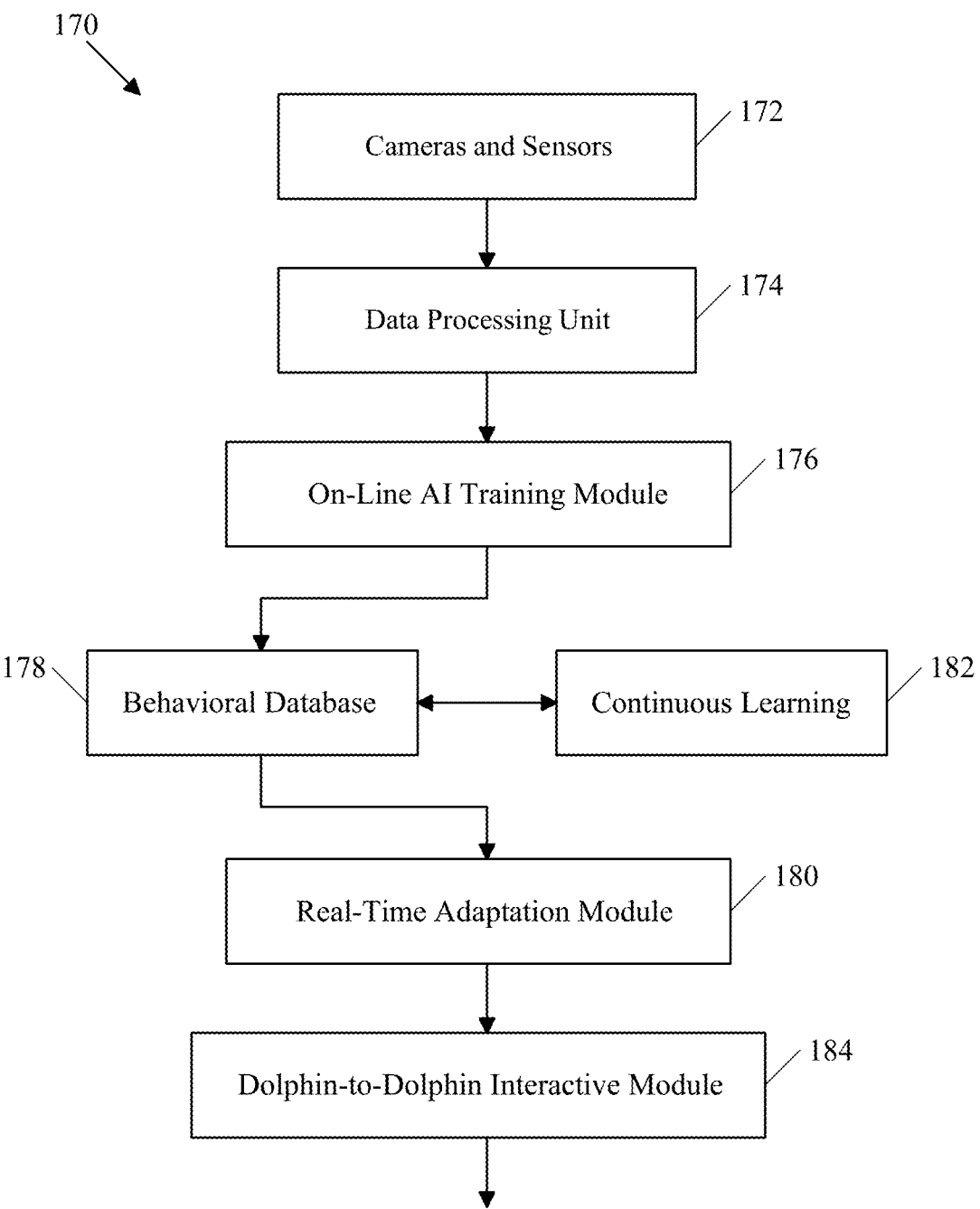
FIG. 10 is a block diagram showing the major components and signal flows of a generative artificial intelligence (AI) based robotic dolphin online training system, according to an embodiment of this invention.

FIG. 10 is a block diagram showing the major components and signal flows of a generative artificial intelligence (AI) based robotic dolphin online training system, according to an embodiment of this invention. The online training system comprises the following main components:

Cameras and Sensors (172): Continuously capture live video and audio data of the behavior of the real dolphin; and provide the data to the Data Processor Unit (174).

Data Processor Unit (174): Processes live video and audio data in real-time, extracting key behavioral patterns and actions; and provides processed data to the Online AI Training Module (176).

Online AI Training Module (176): Analyzes the processed data to learn the behaviors, movements, and responses of the real dolphin; and updates the Behavioral Database (178) with new patterns and actions.

Behavioral Database (178): Stores new patterns and actions learned from the real dolphin; updates from the Online AI Training Module (176); and provides data to the Real-Time Adaptation Module (180). In addition, it works with the Continuous Learning Module (182) to ensure ongoing updates and improvement.

Real-Time Adaptation Module (180): Allows the robotic dolphin to implement learned behaviors and adapt in real-time.

Continuous Learning Module (182): Continuously updates the AI model with new data from the real dolphin's activities. It also works with the Behavioral Database to ensure the AI model keeps evolving.

Interactive Module (184): Facilitates interaction and play between the real dolphin and the robotic dolphin; and enhances the learning process through practical application.

These components work together within the generative AI-based online training system (170) to enable the robotic dolphin to continuously learn and mimic the behaviors of a real dolphin. The system captures signals through cameras and sensors, processes the data to extract behavioral patterns, updates the AI model with new behaviors, and implements learned behaviors in the robotic dolphin for real-time adaptation and interaction.

The generative AI-based online training system (170) is seamlessly integrated with all key components of sensors, actuators, the generative AI model, and the robotic dolphin guidance and control system described in Section E so that this robotic dolphin (162) can become smarter over time without human interaction. This innovative design ensures that the robotic dolphin continuously evolves and improves its behavior by learning from the real dolphin in real-time. The system captures live video and sensory data, processes it to extract key behavioral patterns, and updates the AI model to implement learned behaviors in real-time. This allows the robotic dolphin to mimic the actions and responses of the real dolphin accurately, providing a reliable and consistent companion that can perform various tasks with increasing efficiency and intelligence over time.

This innovative approach can be applied on a large scale. For example, an aquatic theme park or aquarium requiring 10 dolphins can first train one robotic dolphin alongside a well-trained real dolphin. After the training is complete, the AI model in the robotic dolphin can be copied to 9 other robotic dolphins with the same design. This method allows the aquatic theme park or aquarium to obtain 10 well-trained robotic dolphins simultaneously, ensuring consistent behavior and performance across all robotic dolphins.

These fish-like robots can be controlled remotely by the user. By sending a signal, users can dispatch the robots to the ocean for specific tasks or missions. This remote control capability allows for flexible deployment and targeted interventions, enabling users to respond quickly to emerging issues or perform scheduled tasks with precision. Whether for marine biology research, underwater inspection, environmental monitoring, or treasure hunting for sunken ships, the ability to remotely control these robots enhances their versatility and effectiveness.

Furthermore, the fish-like robots can be called back to a designated "dock" or base station when not in use. This dock serves as a central hub where the robots can be securely stored, monitored, and maintained. The dock provides a safe place for the robots to return for recharging, updates, or simply to rest between tasks. This feature ensures that the robots are always ready for deployment, maximizing their operational efficiency and lifespan.

H. Conclusion

The motivation to develop a robotic shark and a fish-like robot empowered by generative artificial intelligence (Gen-AI) fits the mega-trend of the 4th Industrial Revolution, where everything will be smart. In the not-too-distant future, humanoid robots and robotic creatures will be deployed on a large scale to enhance various sectors, including industrial automation, environmental monitoring, disaster response, wildlife conservation, natural resources exploration, agriculture, healthcare, and public safety. These advancements will lead to more efficient resource management, quicker emergency responses, better protection of natural habitats, increased industrial and agricultural yields, and improved safety and security in public spaces, profoundly benefiting our society.

The applicant of this patent has many years of experience in technology innovation in industrial automation, renewable energy, and artificial intelligence. Our goal is to contribute to the exciting technology transformation enabled by generative artificial intelligence in various applications that can make a significant impact on our society and the world.

The invention claimed is:

1. A fish-like robot comprising:
a) a body comprising:
(i) a head;
(ii) a plurality of eyes;
(iii) a body structure to house or connect robot components;
(iv) a plurality of fins; and
(v) a tail;
b) a plurality of sensors configured to capture environmental data, including at least one video camera, at least one audio microphone, and at least one swimming sensor;
c) a power supply;
d) a guidance and control system comprising a trained and continuously updated artificial intelligence (AI) model using underwater behavioral patterns and actions of a real fish, wherein the guidance and control system is configured to process the environmental data captured by the sensors and generate control signals; and
e) a plurality of actuators responsive to the control signals generated by the guidance and control system, wherein the plurality of actuators are configured to manipulate at least the plurality of fins and the tail to perform autonomous swimming and underwater grasping.

2. The fish-like robot of claim 1, wherein the plurality of eyes comprises at least one camera and one sonar sensor.

3. The fish-like robot of claim 1, further comprising a wireless communication module configured to transmit data captured by the plurality of sensors to a remote monitoring station.

4. The fish-like robot of claim 1, wherein the plurality of sensors further comprises environmental sensors configured to measure temperature, pressure, depth, and salinity.

5. The fish-like robot of claim 1, wherein the guidance and control system comprises a navigation module configured to use GPS signals for determining a location and path of the fish-like robot.

6. The fish-like robot of claim 1, wherein the power supply comprises a battery and a wireless charging system allowing the fish-like robot to charge the battery autonomously.

7. The fish-like robot of claim 1, wherein the plurality of fins and the tail further comprise actuators configured to adjust the plurality of fins and the tail.

8. The fish-like robot of claim 1, further comprising a plurality of robot arms that can be extended and controlled from the body of the fish-like robot to perform tasks.

9. The fish-like robot of claim 1, wherein the fish-like robot is a dolphin-like robot.

10. The fish-like robot of claim 1, wherein the fish-like robot is a shark-like robot.

11. A guidance and control system of a fish-like robot, comprising:
   a) a plurality of sensors configured to capture environmental data, the sensors comprising at least one video camera, at least one audio microphone, and at least one swimming sensor;
   b) an artificial intelligence (AI) model trained and continuously updated using underwater behavioral patterns and actions of a real fish and configured to process the environmental data captured by the plurality of sensors and provide the fish-like robot swimming and motion guidance;
   c) a computing processing unit configured to execute the AI model, control algorithms, and provide guidance commands and control signals; and
   d) a plurality of actuators responsive to the control signals, wherein the plurality of actuators are configured to manipulate parts of the fish-like robot to perform autonomous swimming and underwater grasping.

12. The guidance and control system of claim 11, wherein the guidance and control system is configured to perform obstacle detection and avoidance using data from the plurality of sensors.

13. The guidance and control system of claim 11, wherein the AI model is further configured to optimize swimming paths based on real-time environmental data.

14. The guidance and control system of claim 11, further comprising a wireless communication module configured to transmit data to, and receive data from, a remote monitoring station.

15. The guidance and control system of claim 11, further comprising a GPS module configured to provide location data for navigation and swimming control of the fish-like robot.

16. The guidance and control system of claim 11, wherein the plurality of actuators are further configured to adjust a plurality of fins and a tail of the fish-like robot.

17. A robotic dolphin online training system, comprising:
   a) a live video capture system configured to capture real-time video data of behaviors of a real dolphin;
   b) a data processing unit configured to process the captured video data and extract key behavioral patterns and actions of the real dolphin;
   c) a generative artificial intelligence (AI) model configured to analyze the processed data and learn underwater behaviors, movements, and responses of the real dolphin;
   d) a real-time adaptation system configured to allow a robotic dolphin to implement learned behaviors including underwater grasping and adapt in real-time; and
   e) a continuous learning system configured to update the AI model with new data from activities of the real dolphin.

18. The robotic dolphin online training system of claim 17 further configured to seamlessly integrate with a guidance and control system of the robotic dolphin.

19. The robotic dolphin online training system of claim 17, wherein the real-time adaptation system comprises a feedback mechanism to adjust behaviors of the robotic dolphin based on real-time interactions and responses from the real dolphin.

20. The robotic dolphin online training system of claim 17, wherein the AI model can be saved and copied for use with other robotic dolphins to produce more trained robotic dolphins.

\* \* \* \* \*